United States Patent
Avella et al.

(10) Patent No.: US 12,531,901 B2
(45) Date of Patent: Jan. 20, 2026

(54) POISONING AND TRACKING CREDENTIALS FOR PHISHING WEB SITES

(71) Applicant: Fortinet, Inc., Sunnyvale, CA (US)

(72) Inventors: Leonardo Avella, Castelnuovo Rangone (IT); Vinicio Bonanni, Milan (IT)

(73) Assignee: Fortinet, Inc., Sunnyvale, CA (US)

( * ) Notice: Subject to any disclaimer, the term of this patent is extended or adjusted under 35 U.S.C. 154(b) by 239 days.

(21) Appl. No.: 18/544,259

(22) Filed: Dec. 18, 2023

(65) Prior Publication Data
US 2025/0202935 A1    Jun. 19, 2025

(51) Int. Cl.
*H04L 9/40*    (2022.01)

(52) U.S. Cl.
CPC ...... *H04L 63/1483* (2013.01); *H04L 63/1491* (2013.01)

(58) Field of Classification Search
CPC .................. H04L 63/1483; H04L 63/1491
See application file for complete search history.

(56) References Cited

U.S. PATENT DOCUMENTS

| 11,316,895 B1* | 4/2022 | Wright | H04L 63/1483 |
| 2013/0212658 A1* | 8/2013 | Amaya Calvo | H04L 63/083 726/6 |

* cited by examiner

*Primary Examiner* — Huan V Doan
(74) *Attorney, Agent, or Firm* — Law Office of Dorian Cartwright; Dorian Cartwright

(57) ABSTRACT

Poisoned credentials are entered to the login section of phishing web sites automatically identified as related to a legitimate web site. The poisoned credentials are not valid credentials with respect to the login section of the legitimate web site. Later, a login attempt to the legitimate web site is detected on the enterprise network by a malicious actor making use of the poisoned credentials. Data about a malicious actor is collected using the poisoned credentials including an IP address and a time. A security action can also be taken against the malicious actor with respect to the poisoned credentials.

9 Claims, 4 Drawing Sheets

POISONING AND TRACKING CREDENTIALS FOR PHISHING WEB SITES

FIELD OF THE INVENTION

The invention relates generally to computer networks, and more specifically, for proactively secure an enterprise network by distributing and tracking poisoned credentials related to the enterprise network on phishing web sites.

BACKGROUND

To date, EASM (External Attack Surface Management) solutions are able to identify malicious sites that emulate the login of actual customer sites to steal credentials and are able to recover leaked credentials found in the various databases for sale on the dark web. However, these solutions are not able to carry out any active or interactive tracking or response actions regarding these sites and these situations. Once information has been retrieved about the leaked sites and credentials, it's difficult to assess a source of malicious activity.

Phishing web sites are one source for harvesting credentials. In more detail, a malicious web site designed to mirror a legitimate web site confuses users about authenticity, leading to the user presenting legitimate credentials to the malicious web site. These credentials can then be sold on the dark web or used for self to login to legitimate web sites. Consequently, the users sensitive data and transaction privileges can be misused.

What is needed is a robust technique for proactively secure an enterprise network by distributing and tracking poisoned credentials related to the enterprise network on phishing web sites.

SUMMARY

To meet the above-described needs, methods, computer program products, and systems for proactively secure an enterprise network by distributing poisoned credentials related to the enterprise network on phishing web sites.

In one embodiment, one or more phishing web sites are detected having a login section and corresponding to a legitimate web site on the enterprise network. Poisoned credentials can be entered to the login section of the phishing web site. The poisoned credentials are not valid credentials with respect to the login section of the legitimate web site.

In another embodiment, a login attempt to the legitimate web site is detected on the enterprise network by a malicious actor making use of the poisoned credentials. Data about a malicious actor is collected using the poisoned credentials including an IP address and a time. A security action can also be taken against the malicious actor with respect to the poisoned credentials.

Advantageously, network performance is improved with better security from phishing web sites.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for proactively secure an enterprise network by distributing and tracking poisoned credentials related to the enterprise network on phishing web sites. The following disclosure is limited only for the purpose of conciseness, as one of ordinary skill in the art will recognize additional embodiments given the ones described herein.

I. Systems for Poisoning and Tracking Phishing Credentials (FIGS. 1-2)

Figure 1:
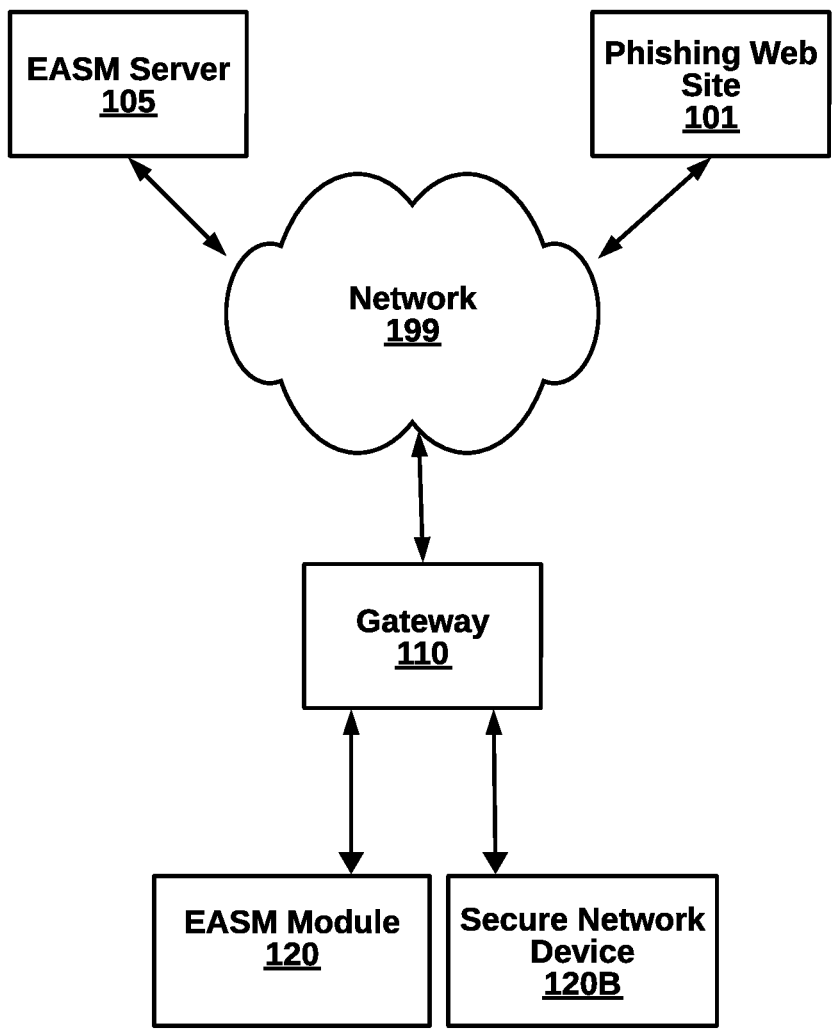
FIG. 1 is a high-level block diagram illustrating aspects of a system coordinating for proactively secure an enterprise network by distributing and tracking poisoned credentials related to the enterprise network on phishing web sites, according to some embodiments.
Figure 2:
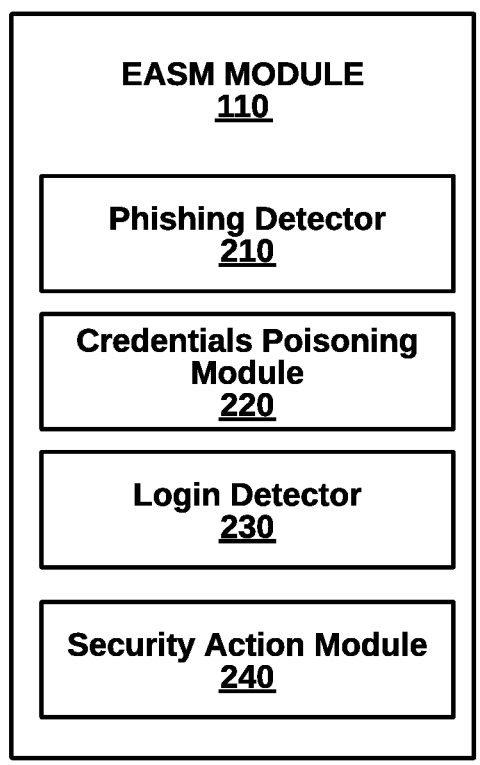
FIG. 2 is a more detailed block diagram illustrating an EASM module of the system of FIG. 1, according to one embodiment.

FIG. 1 is a high-level block diagram illustrating a system 100 for proactively secure an enterprise network by distributing and tracking poisoned credentials related to the enterprise network on phishing web sites, according to an embodiment. The system 100, in an embodiment, is an EASM (External Attack Surface Management) system or a vulnerability assessment system. The system 100 includes an EASM server 105 and a phishing web site 115, outside of the enterprise network, and EASM module 120 and access point 120. Other embodiments of the system 100 can include additional components that are not shown in FIG. 1, such as routers, switches, network gateways, RADIUS servers, and firewalls, as well as additional access points and one more multiple stations are also possible. For example, the system 100 of FIG. 1 can have hundreds of stations connected to access points distributed over different LANs. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system 199 via hard wire (e.g., EASM server 105, phishing web site 115, EASM module 120 and access point 120). The data communication network 199 can be composed of any combination of hybrid networks, such as an SDWAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPV4 or IPV6 address spaces.

The EASM server 105 alone or in combination with EASM module 110 can invalidate attacker databases by filling them with false unique and tracked credentials (e.g., 50, 100 or 200 sets of poisoned credentials). These credentials appear to be valid and belonging to the organization. By doing so, correlation rules can reveal which website, by whom, and in what way these credentials have been stolen. At the same time, then, attackers can be identified as being from within the organization or outside. Different security actions are possible in response. The EASM server 105 can be a software as a service run by a third-party security vendor. Different enterprise networks submit information collected about phishing web sites and malicious actors, connected to poisoned credentials. Thus, the same phishing web site can be tracked across different enterprise networks. In one implementation, phishing web sites can be automatically searched using search, for example, APIs for Google, XML files, or screenshots of websites. Potential search results can be ranked based on similarity scores when comparing the phishing web site search to legitimate web sites. A threshold of, for example, similarity score or search result ranking determines how many results are attacked. Similarity can be determined by, for example, K-means clustering, Bayesian Classification, or the like, or characteristics. One example, compares a legitimate URL to an intentional typo URL used for phishing when users unintentionally make a typo when entering the URL. The process can be trained (e.g., machine learning or artificial intelligence) with known pairs of legitimate pages and phishing pages. In one embodiment, the EASM module 110 can be an independent device, and in another embodiment, be a process embedded in a Wi-Fi controller, a gateway, an access point or other network device. In some embodiments, the EASM server 105 actively poisons credential on behalf of an enterprise network, and the EASM module 110 is an agent or daemon on the enterprise network that detects use of poisoned credentials. These detections can be reported upstream to the EASM server 105.

Credentials, in one case, are related to a legitimate website hosted on an HTTP server on the enterprise network or on the Internet. The credentials can be for clients of a business to log in and see their account. In another case, credentials are related to authentication on an enterprise network to Windows, RADIUS, or other login services. One example of a login is a combination of username and password. In still another case, a malicious or non-malicious user logs in to the network device 140 remotely using a web app, Windows or a web browser. Other example credentials include account number, email address, telephone number, room number, and last name. Passwords can be alphanumeric combinations of letters, numbers, and special characters, for example.

FIG. 2 is a more detailed block diagram illustrating the EASM module 110 of the system 100 of FIG. 1, according to an embodiment. The Wi-Fi controller 110 includes a phishing detector 210, a credentials poisoning module 220, a login detector 230 and a security action module 240. The components can be implemented in hardware, software, or a combination of both.

The phishing detector 210 can identify a phishing web site having a login section and corresponding to a legitimate web site on the enterprise network.

The credentials poisoning module 220 to enter poisoned credentials to the login section of the phishing web site, wherein the poisoned credentials are not valid credentials with respect to the login section of the legitimate web site.

The login detector 230 is configured to detect a login attempt to the legitimate web site on the enterprise network by a malicious actor making use of the poisoned credentials. In one implementation, login credentials is recognized on a firewall access log or a VPN access log. The login detector 230 collects data about a malicious actor using the poisoned credentials including an IP address and a time. Other data can include a country, a user, a protocol, a port, credentials user, and the like.

The security action module 240 can take a security action against the malicious actor with respect to the poisoned credentials.

II. Methods for Poisoning and Tracking Phishing Credentials (FIG. 3)

Figure 3:
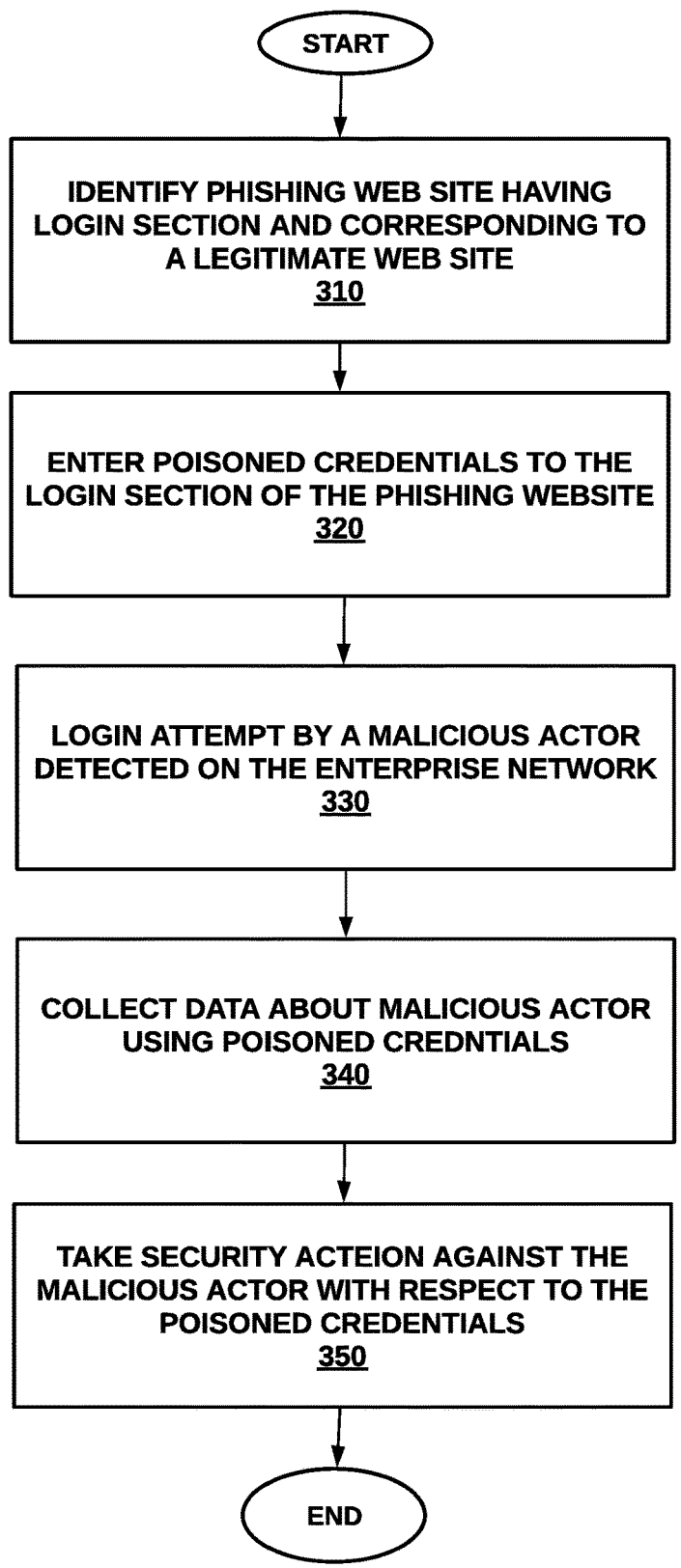
FIG. 3 is a high-level flow diagram illustrating a method for proactively secure an enterprise network by distributing and tracking poisoned credentials related to the enterprise network on phishing web sites, according to an embodiment.

FIG. 3 is a high-level flow diagram of a method 300 for proactively secure an enterprise network by distributing and tracking poisoned credentials related to the enterprise network on phishing web sites, according to an embodiment. The method 400 can be implemented by, for example, system 100 of FIG. 1. The specific grouping of functionalities and order of steps are a mere example as many other variations of method 400 are possible, within the spirit of the present disclosure.

Specifically, at step 310, a phishing web site is identified having a login section and corresponding to a legitimate web site having a login section. The legitimate web site is on the enterprise network or can be hosted on a third party HTTP server.

At step 320, poisoned credentials are entered to the login section of the phishing web site. The poisoned credentials are not valid credentials with respect to the login section of the legitimate web site. Preferably, the poisoned credentials invoke a special process that quarantines interactions. In some cases, the credentials are posted to the dark web for transfer to another malicious actor.

At step 330, a login attempt to the legitimate web site on the enterprise network is detected by a malicious actor making use of the poisoned credentials. Because the poisoned credentials are saved by an EASM module on an enterprise network, the poisoning information can be tied to the login attempt.

At step 340, data about a malicious actor is collected using the poisoned credentials. Example information includes an IP address and a time. In one embodiment, the local data collected is uploaded to a database on an EAMS server.

At step 350, a security action is taken against the malicious actor with respect to the poisoned credentials. If the malicious actor has been previously identified for phishing activity, by an EAMS server that tracks phishing incidents across different enterprise networks, more serious actions can be taken. The actions can be in the form of a set of rules with conditions.

III. Computing Device for Poisoning and Tracking Phishing Credentials (FIG. 4)

Figure 4:
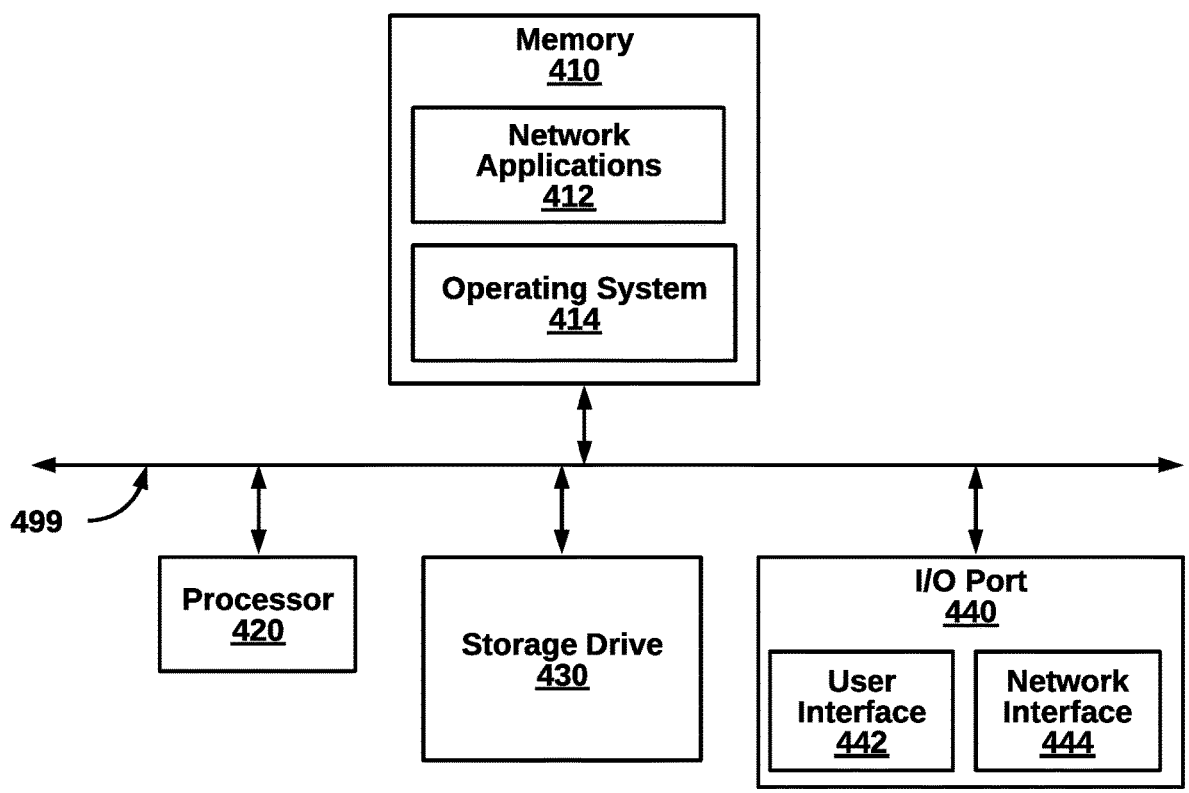
FIG. 4 is a block diagram illustrating an example computing device for the system of FIG. 1, according to one embodiment.

FIG. 4 is a block diagram illustrating a computing device 400 for use in the system 100 of FIG. 1, according to one embodiment. The computing device 400 is a non-limiting example device for implementing each of the components of the system 100, including the EAMS server 105, the phishing web site 101, the gateway 110, the EAMS module 120 and the network device 130. Additionally, the computing device 400 is merely an example implementation itself, since the system 100 can also be fully or partially implemented with laptop computers, tablet computers, smart cell phones, Internet access applications, and the like.

The computing device 400, of the present embodiment, includes a memory 410, a processor 420, a hard drive 430, and an I/O port 440. Each of the components is coupled for electronic communication via a bus 450. Communication can be digital and/or analog, and use any suitable protocol.

The memory 410 further comprises network access applications 412 and an operating system 414. Network access applications can include 412 a web browser, a mobile access application, an access application that uses networking, a remote access application executing locally, a network protocol access application, a network management access application, a network routing access applications, or the like.

The operating system 414 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 420 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 420 can be single core, multiple core, or include more than one processing elements. The processor 420 can be disposed on silicon or any other suitable material. The processor 420 can receive and execute instructions and data stored in the memory 410 or the hard drive 430.

The storage device 430 can be any non-volatile type of storage such as a magnetic disc, EEPROM, Flash, or the like. The storage device 430 stores code and data for access applications.

The I/O port 440 further comprises a user interface 442 and a network interface 444. The user interface 442 can output to a display device and receive input from, for example, a keyboard. The network interface 444 connects to a medium such as Ethernet or Wi-Fi for data input and output. In one embodiment, the network interface 444 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a phishing security server on an enterprise network, for proactively securing an enterprise network by distributing and tracking poisoned credentials related to the enterprise network on phishing web sites, the method comprising:
   receiving an identification of a phishing web site having a login section and corresponding to a legitimate web site having a login section, wherein the legitimate web site is on the enterprise network;
   entering poisoned credentials to the login section of the phishing web site, wherein the poisoned credentials are not valid credentials with respect to the login section of the legitimate web site;
   detecting a login attempt to the legitimate web site on the enterprise network by a malicious actor making use of the poisoned credentials;
   allowing the malicious actor access to a quarantine account on the legitimate web site with the poisoned credentials;
   collecting data about the malicious actor while interacting with the quarantine account using the poisoned credentials including an Internet Protocol (IP) address and a time, wherein the quarantine account appears to be a legitimate account; and
   taking a security action against the malicious actor with respect to the poisoned credentials.

2. The method of claim 1, wherein the poisoned credentials were transferred to the malicious actor over the Dark Web.

3. The method of claim 1, further comprising: sending the data collected about the malicious actor to a cloud-based phishing server to aggregate data collected from different enterprise networks concerning the malicious actor.

4. The method of claim 1, wherein the step of collecting data about the malicious actor comprises collecting an IP address and a time stamp.

5. A non-transitory computer-readable medium in a phishing security server on an enterprise network, for proactively securing an enterprise network by distributing and tracking poisoned credentials related to the enterprise network on phishing web sites, the method comprising:
   receiving an identification of a phishing web site having a login section and corresponding to a legitimate web site having a login section, wherein the legitimate web site is on the enterprise network;
   entering poisoned credentials to the login section of the phishing web site, wherein the poisoned credentials are not valid credentials with respect to the login section of the legitimate web site;
   detecting a login attempt to the legitimate web site on the enterprise network by a malicious actor making use of the poisoned credentials;
   allowing the malicious actor access to a quarantine account on the legitimate web site with the poisoned credentials;
   collecting data about the malicious actor while interacting with the quarantine account using the poisoned credentials including an Internet Protocol (IP) address and a time, wherein the quarantine account appears to be a legitimate account; and
   taking a security action against the malicious actor with respect to the poisoned credentials.

6. The method of claim 5, wherein the poisoned credentials were transferred to the malicious actor over the Dark Web.

7. The method of claim 5, further comprising: sending the data collected about the malicious actor to a cloud-based phishing server to aggregate data collected from different enterprise networks concerning the malicious actor.

8. The method of claim 5, wherein the step of collecting data about the malicious actor comprises collecting an IP address and a time stamp.

9. A phishing security server on an enterprise network, to proactively secure an enterprise network by distributing and tracking poisoned credentials related to the enterprise network on phishing web sites, the phishing security server comprising:
   a processor;
   a network interface communicatively coupled to the processor and to the enterprise network; and
   a memory, communicatively coupled to the processor and storing source code executed by the processor, comprising:
      a phishing detector to receive an identification of a phishing web site having a login section and corresponding to a legitimate web site having a login section, wherein the legitimate web site is on the enterprise network;
      a credentials poisoning module to enter poisoned credentials to the login section of the phishing web site, wherein the poisoned credentials are not valid credentials with respect to the login section of the legitimate web site;
      a login detector to detect a login attempt to the legitimate web site on the enterprise network by a malicious actor making use of the poisoned credentials, wherein the login detector allows the malicious actor access to a quarantine account on the legitimate web site with the poisoned credentials, and collects data about the malicious actor while interacting with the quarantine account using the poisoned credentials including an Internet Protocol (IP) address and a time, wherein the quarantine account appears to be a legitimate account; and
      a security action module to take a security action against the malicious actor with respect to the poisoned credentials.

* * * * *